May 28, 1929.   McCLELLAN C. FULLENLOVE   1,714,862
COMBINED MOTION PICTURE PHOTOGRAPHIC AND PROJECTION APPARATUS
Filed May 15, 1926   4 Sheets-Sheet 1
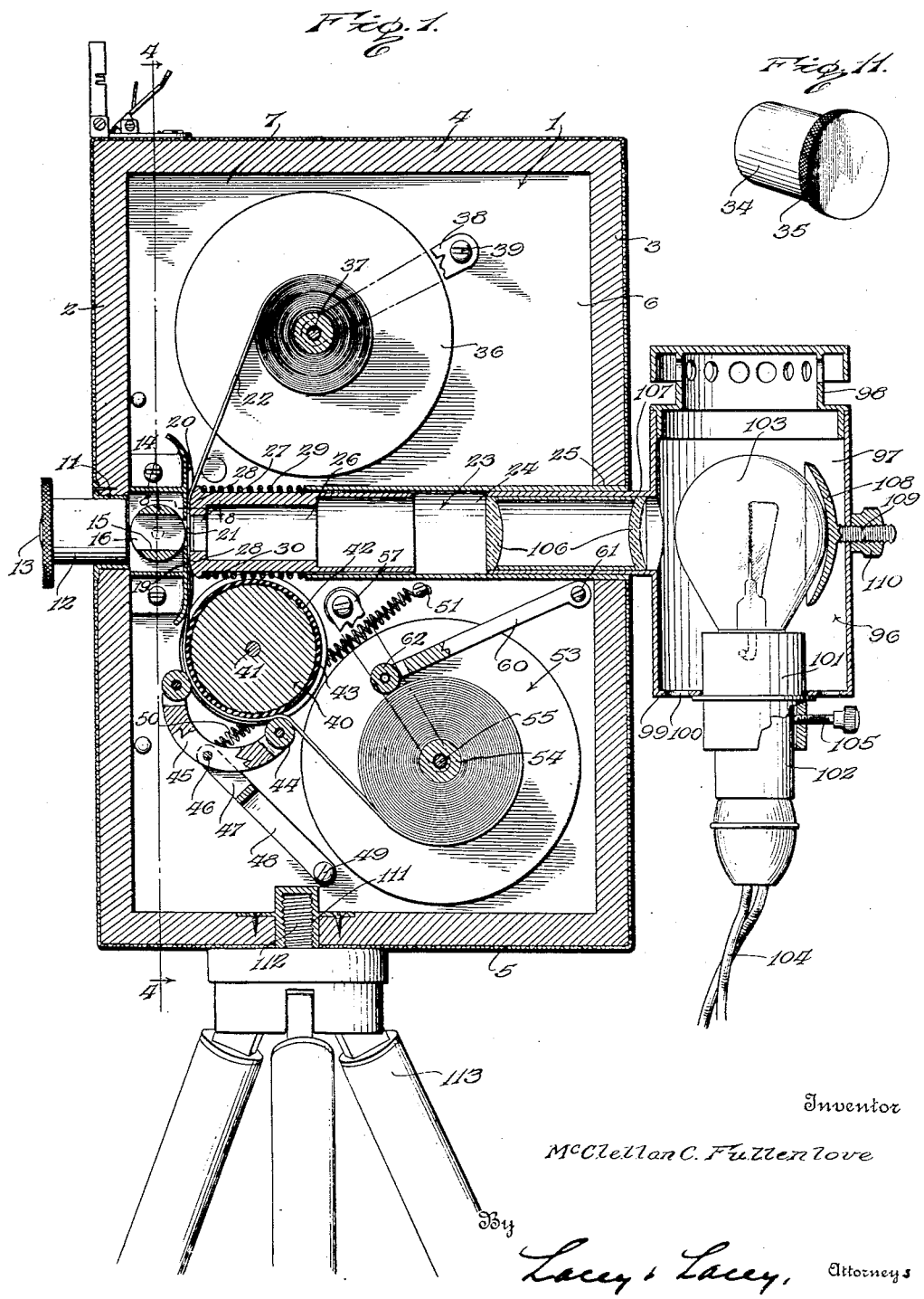
Inventor
McClellan C. Fullenlove
By Lacey & Lacey, Attorneys May 28, 1929.    McCLELLAN C. FULLENLOVE    1,714,862
COMBINED MOTION PICTURE PHOTOGRAPHIC AND PROJECTION APPARATUS
Filed May 15, 1926    4 Sheets-Sheet 2
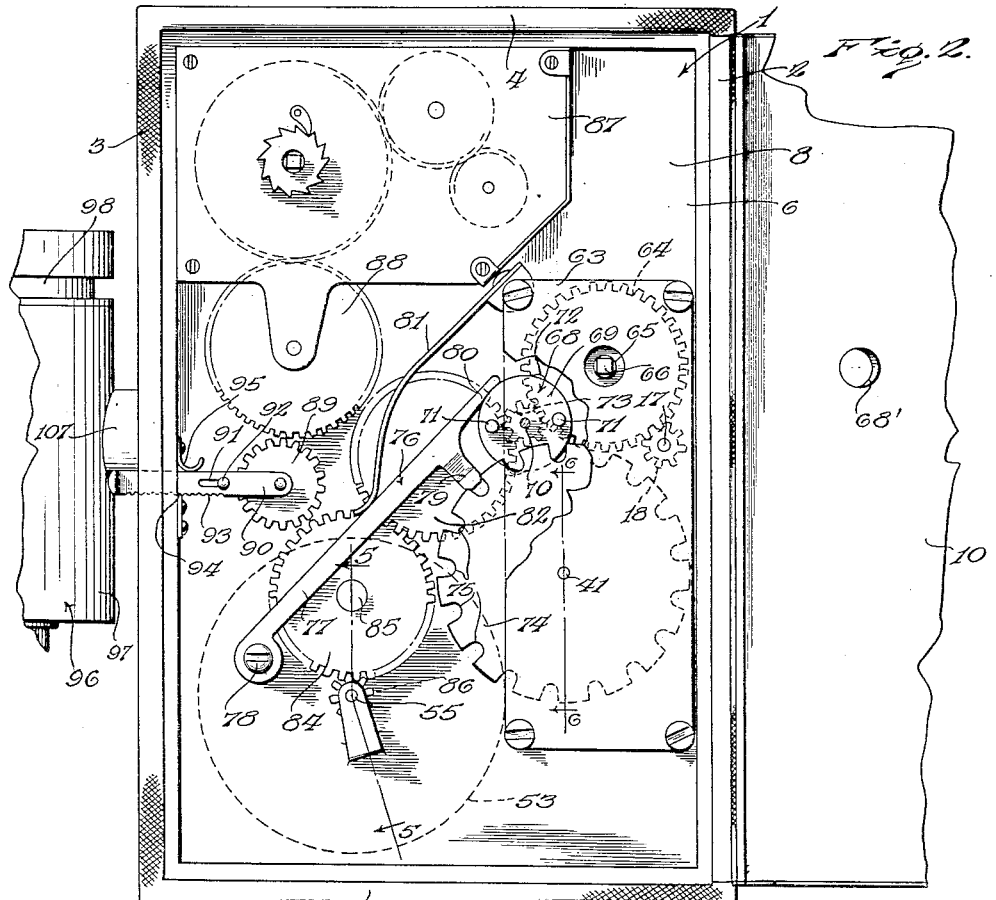
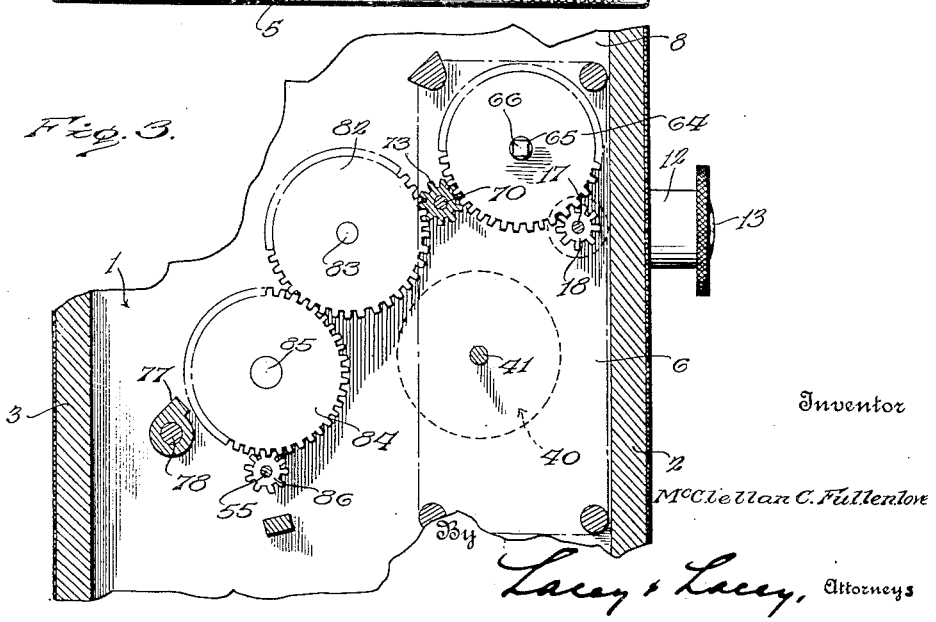
Inventor
McClellan C. Fullenlove
By Lacey & Lacey, Attorneys

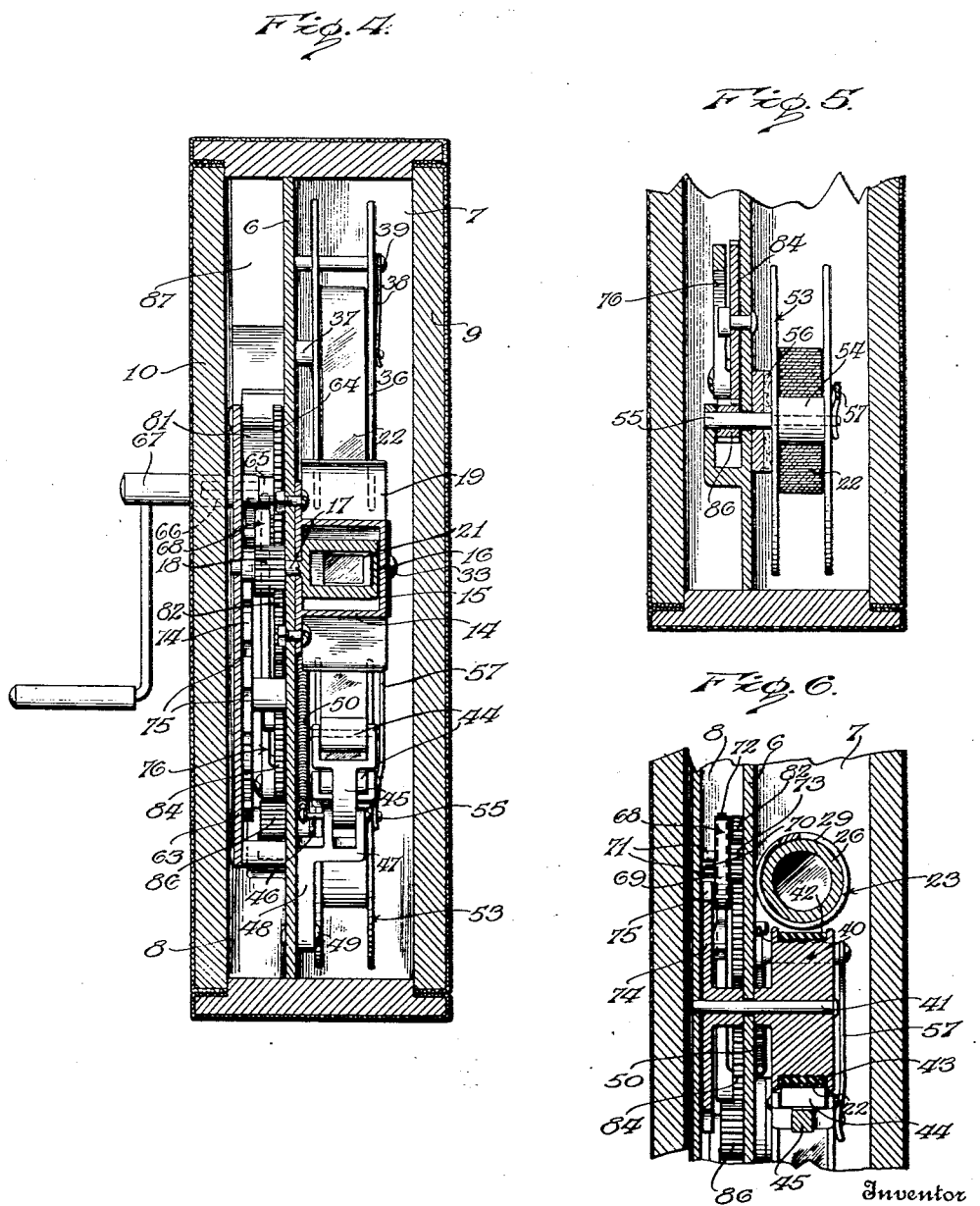

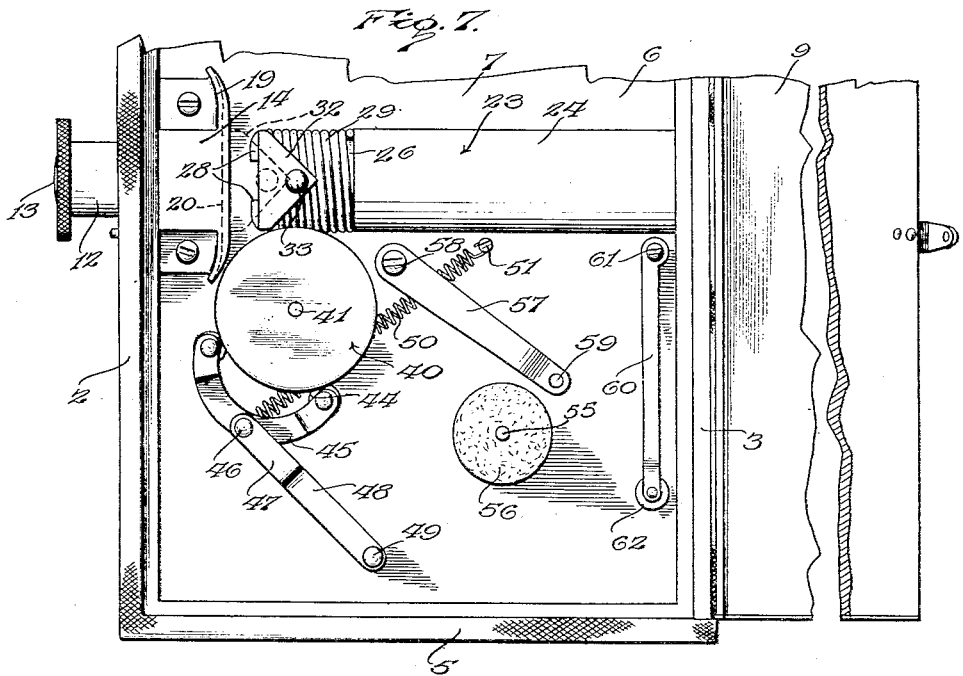
Fig. 7.
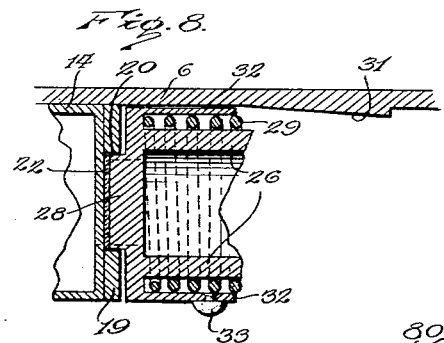
Fig. 8.
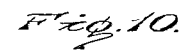
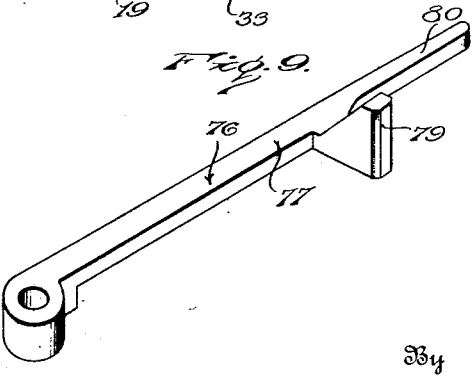
Fig. 9. Fig. 10.
Inventor
McClellan C. Fullenlove
By Lacy & Lacy, Attorneys Patented May 28, 1929.

1,714,862

UNITED STATES PATENT OFFICE.

McCLELLAN C. FULLENLOVE, OF TOLEDO, OHIO, ASSIGNOR, BY DIRECT AND MESNE ASSIGNMENTS, TO FOTO-GRAF-IC CO. OF AMERICA, INC., OF MONTCLAIR, NEW JERSEY, A CORPORATION OF NEW JERSEY.

COMBINED MOTION-PICTURE PHOTOGRAPHIC AND PROJECTION APPARATUS.

Application filed May 15, 1926. Serial No. 109,305.

This invention relates to a novel apparatus which may be selectively employed as a motion picture camera and as a motion picture projector, and the primary object of the invention is to provide a compact apparatus of this character which may be converted for either use in a few moments time by an extremely simple substitution of parts.

Another object of the invention is to provide an exceptionally compact apparatus of the character described which may be as conveniently carried about and employed as the ordinary camera, in utilizing the same in the taking of motion pictures, and which may be as conveniently employed in the home or elsewhere in the projection of the films thus obtained, so that one employing the apparatus may take motion pictures of interesting events and, after the customary development of the films may project the pictures at any time desired, thus greatly enhancing the pleasure which is experienced in the art of photography as distinguished from the present practice of photographing scenes or images and, by the usual processes, obtaining a single still picture thereof. For example, one who is making a tour and who is provided with the apparatus may photograph various scenes in which there is animation and at a future time project the developed films in his home for the entertainment of his family or friends and thus present an extremely interesting visualization of objects of interest observed by him in his travels.

Another object of the invention is to so construct the apparatus that it may be rendered as compact as an ordinary hand camera and as readily operated in the taking of pictures, and, to likewise so construct the apparatus that when the pictures are to be projected, this may be effected by employing the ordinary lighting circuit in the home and by a slight interchange of parts of the apparatus.

Another object of the invention is to provide, in apparatus of this class, film feeding mechanism in combination with a film gate so constructed and arranged as to permit of introduction and threading of the film, both when the apparatus is employed as a camera and as a projection apparatus, with great facility, and by an extremely simple manipulation of the parts, which even an inexperienced person may master in a few moments time.

In the accompanying drawings:

Figure 1 is a vertical front to rear sectional view through the apparatus, the same being arranged for the projection of a film produced by previously employing the apparatus as a camera.

Figure 2 is a side elevation of the apparatus, looking at the side thereof opposite the side which is disclosed in Figure 1, the corresponding door of the casing of the apparatus being shown in open position.

Figure 3 is a fragmentary view partly in section and partly in elevation, similar to Figure 2, illustrating the gearing more in detail.

Figure 4 is a vertical transverse sectional view through the apparatus, taken substantially on the line 4—4 of Figure 1, looking in the direction indicated by the arrows.

Figure 5 is a similar view taken substantially on the line 5—5 of Figure 2, looking in the direction indicated by the arrows.

Figure 6 is a similar view on the line 6—6 of Figure 2, looking in the direction indicated by the arrows.

Figure 7 is a view similar to Figure 1, but with the parts in elevation and with some of the parts removed.

Figure 8 is a detail horizontal sectional view through the film gate, taken substantially on the line 8—8 of Figure 1, looking in the direction indicated by the arrows.

Figure 9 is a perspective view of the detent of the intermittent film feeding mechanism.

Figure 10 is a perspective view of a gear element of the intermittent film feeding mechanism.

Figure 11 is a perspective view of a light ray excluding cap which is employed in lieu of the illuminating unit, in converting the apparatus from a projecting apparatus to a motion picture camera.

The apparatus is mounted within a casing 1 which may be of wood or any other material found suitable for the purpose and which comprises a front wall 2, a rear wall 3, a top 4, and a bottom 5, the casing being divided interiorly by a partition wall 6 to provide compartments 7 and 8 in the first of which are housed the film storing, guiding and take-up means, as will presently be explained, the intermittent gearing being mounted within the compartment 8. The compartment 7 is closed by a door 9 hinged so as to be readily swung open to expose the film storing, feeding, and take-up means, and thus provide for ready and quick arrangement of the film reels within the casing and the threading of the film, as well as the ready removal of the film from the casing. A similar door 10 closes the other side of the casing and provides for access to the intermittent gear motion.

The front wall 2 of the casing has an opening 11 therein communicating with the compartment 7, and arranged within the opening is the usual lens barrel 12 in which the lens 13 is mounted, this lens serving as a photographic lens when the apparatus is employed as a camera and as the objective lens when the apparatus is employed in projecting pictures. The numeral 14 indicates a shutter housing which is preferably of rectangular form and is secured upon the partition wall 6 within the said compartment 7 and with its open side disposed against the inner side of the front wall 2 of the casing and symmetrically positioned with respect to the opening 11 or, in other words, the inner end of the lens barrel 12. Mounted within the housing is the shutter which is indicated by the numeral 15 and is of the barrel type, having a diametric aperture or slot 16 therethrough, and this shutter is provided at one end with a short shaft 17 upon which is fixed a pinion 18 driven in a manner to be presently explained, the shaft extending through one side wall of the housing 14 and through the partition wall 6, as clearly shown in Figure 4 of the drawings. The housing is closed opposite its open side by a wall which is indicated by the numeral 19 and which constitutes the fixed part of the film gate of the motion head, the rearwardly presented side of the wall having a vertical groove 20 formed therein and the upper and lower sides of the wall being curved forwardly so as to provide for more convenient threading of the film and the feeding of the film in the groove or channel 20 without any liklihood of injury to the film. This wall has an aperture 21 which constitutes the framing aperture of the gate and which is symmetrically arranged with relation to the optical axis of the lens 13 and the axis of the shutter 15, the said aperture being rectangular and determining the dimensions of the picture areas upon the film, which film is indicated by the numeral 22.

In order that the apparatus may be employed in projecting pictures, a light ray conducting tube assemblage indicated in general by the numeral 23, is provided, and this assemblage embodies a fixed tubular section 24, mounted at one end in an opening 25 in the rear wall 3 of the casing, and a tubular section 26 which is telescopically adjustably fitted into the other end of the section 24, the tube assemblage being, of course, housed within the compartment 7. The section 26 of the assemblage is closed at its end which is presented toward the fixed member 19 of the film gate except for an opening 27 which is rectangular and symmetrically arranged with respect to the framing opening 21. Rounded bosses 28 are formed upon the said end of the section 26 and engage between the side walls of the channel 20 and bear against the film 22 when the film is threaded through the gate, a spring 29 being arranged upon the said section 26 and bearing at one end against the shoulder 30 resulting from the formation of the bosses 28, and at its other end against the forward end of the tubular section 24 and yieldably holding the said section 26 extended in a forward direction so as to maintain the film in flat condition where it passes the framing opening 21. At this point it will be evident that in order to thread or unthread the film, it is only necessary to shift the tubular section 26 rearwardly against the tension of the spring 29, thus retracting the bosses from engagement in the channel 20 of the film gate section 19, the forward end of the said section 26 including the bosses 28, constituting the other member of the film gate and, in a sense, corresponding to the hinged member of the ordinary film gate. As it is desirable that both hands be free when arranging the film, the partition wall 6 is provided with a slightly inclined surface portion 31 directly opposite one side of the forward end of the tubular section 26 and this end of the said section is preferably provided at its opposite sides with rearwardly extending side members 32, that member 32 which is adjacent the partition wall 6 being adapted to ride frictionally onto the inclined surface 31 when the tubular section 26 is shifted rearwardly and thus bind sufficiently to cause the section to remain in retracted position against the tension of the spring 29 during the film-adjusting operation. The other side member 32 of the tubular section 26 preferably carries a finger button 33 which provides for ready rearward shifting of the said tubular section and likewise for ready forward movement of the same after the film has been threaded, and until the other member 32 has cleared the inclined surface 31 and the spring 29 is permitted to act to move the section 26 to such position that the bosses 28 will engage in the channel 20 and with the film. Figure 1 of the drawings shows the film gate closed or, in other words, shows the section 26 shifted forwardly to engage and hold the film in the channel 20, whereas Figure 7 illustrates the manner in which the section 26 is held in retracted position while the film is being adjusted, the section, however, being shown shifted forwardly in dotted lines in the said figure. Means is provided, as will be presently described, for projecting light rays through the tube assemblage 23 when the apparatus is employed as a motion picture projection apparatus, and at this point it may be stated that when the apparatus is employed as a motion picture camera, the plug, indicated by the numeral 34 and shown in Figure 11 of the drawings, is snugly fitted in the rear end of the tube section 24 so as to exclude light rays which would otherwise enter the tube assemblage, and, therefore, when this plug is in place, light rays can reach the sensitized film only through the lens 13, the shutter opening, and the framing opening 21 of the film gate, and there will be no likelihood of the film being light struck. In order that the plug 34 may be conveniently inserted and removed, it is preferably provided with a milled head indicated by the numeral 35.

The storage reel for the film is indicated by the numeral 36 and the said reel is loosely mounted upon a shaft 37 which is fixed upon the partition wall 6 and projects into the compartment 7, and in order to normally retain the reel in place upon the shaft, a resilient retaining finger 38, is fixed at one end, as at 39, beyond the periphery of the reel and has its other end apertured to engage over the outer end of the shaft 37, the latter end of the said retaining finger bearing frictionally against the side of the reel at the center thereof. The storage reel 36 is, of course, mounted above the tube assemblage 23 so that the film is led downwardly to said assemblage and through the film gate, and it will be understood at this point that the reel may be dismounted by springing the free end of the retaining finger 38 outwardly and swinging the finger downwardly about the screw or other element 39 by which it is mounted upon the partition wall 6.

From the film gate, the film passes downwardly and about the periphery of a friction wheel 40 which is intermittently rotated in a manner to be presently described, the said wheel being fixed upon a shaft 41 journaled through the partition wall 6 and having its periphery grooved, as indicated by the numeral 42, and being provided within its grooved periphery with a friction band 43 of any suitable friction material for contact with the film. The portion of the film which passes about the periphery of the wheel 40 is held in firm engagement with the friction band 43 through the medium of presser rolls 44 which are mounted for free rotation at the ends of a yoke 45 which, in turn, is mounted freely upon a supporting pin 46 extending between the spaced portions 47 of an arm 48 which is pivotally mounted at its lower end, as at 49, upon the partition wall 6. A tension spring 50 is connected at one end to the arm, preferably at the point of location of the pin 46, and at its other end to a fixed element 51 upon the partition wall 6, above and rearwardly of the arm, and this spring serves to yieldably hold the arm 48 swung in an upward direction to cause the presser rolls 44 to hold the film firmly in contact with the friction band 43.

The numeral 53 indicates the take-up reel of the film feed and this reel is provided with a hub 54 fitted upon a shaft 55 which is journaled through the partition wall 6 and which has fixed upon it, within the compartment 7, a friction disc 56 which frictionally contacts one side of the said take-up reel and acts to impart rotary motion to the reel when the shaft 55 is rotated in the manner to be presently explained. A retaining finger 57 corresponding to the retaining finger 38 for the storage reel 36, is mounted at one end as at 58, upon the partition wall 6 and has an apertured outer end 59 to engage over the outer end of the shaft 55 and thus retain the reel 53 in place upon the shaft. In order to prevent whipping of the film as the film is wound upon the reel in its passage from the friction wheel 40, an arm 60 is pivotally mounted, as at 61, upon the partition wall and extends between the heads of the reel 53 and carries a presser roll 62 which rides upon the roll of film upon the reel, as best shown in Figure 1 of the drawings.

The numeral 63 indicates a plate which is mounted upon the partition wall in spaced relation thereto and within the compartment 8, and this plate has a bearing for the shutter shaft 17 and also a bearing for the end of the shaft 41 of the intermittent friction wheel 40. The numeral 64 indicates a gear which is fixed upon a shaft 65 mounted in suitable bearings in the plate 63 and partition wall 6, and this shaft 65 has a squared end 66 to which an operating crank handle 67 may be applied, the said crank handle being inserted through an opening 68' formed in the door 10 so that the crank handle may be operated exterior to the casing. The gear 64 meshes with the pinion 18 upon the shutter shaft 17 so that in the rotation of the gear, rotary motion is imparted to the said shutter 15. The numeral 68 indicates in general a pin wheel which constitutes a part of the intermittent gear motion and which comprises a disc 69 mounted upon a shaft 70 having bearing in the plate 63 and the partition wall 6. The disc 69 is provided upon one of its faces with diametrically oppositely located pins 71 and upon its periphery at diametrically opposite points with cam portions 72, and a pinion 73 is formed integral with or fixed for rotation with the said disc and upon that face thereof opposite the face from which the pins 71 project. The pinion 73 meshes with the gear 64, as clearly shown in Figures 2 and 3 of the drawings, and, therefore, when the crank handle is turned and rotary motion is imparted to the shaft 65, corresponding continuous motion will be imparted to the pin wheel 68. Fixed upon the shaft 41 as shown in Figure 6, and rotating beside the plate 63, is a gear 74 having a series of notches 75 in its periphery. The gear 74 is so positioned that, in the rotation of the pin wheel 68, the pins 71 will successively engage in the notches 75 in the said gear and intermittently rotate the gear, thus imparting intermittent movement to the friction wheel 40 which is, as previously explained, likewise fixed upon the shaft 41, and the parts are so proportioned that as intermittent movement is imparted to the friction wheel 40, the film will be advanced through the film gate and past the framing opening 21 a distance of one picture space at each movement of the said friction wheel, these picture spaces corresponding in area to the dimensions of the framing opening 21. It will be observed at this point that the film employed is not provided with the usual perforations for the teeth of a film feeding sprocket so that the film may be made much narrower and inasmuch as it is merely frictionally fed through intermittent rotation of the friction wheel 40, there is no appreciable wear on the film as in the case of the ordinary perforated film.

It is desirable to arrest the motion of the film as each picture area thereof is brought into registration with the framing opening 21 of the film gate and maintain the film stationary during each successive exposure or period of projection, depending upon whether the apparatus is employed as a camera or as a projector, and in order to accomplish this, a detent, indicated in general by the numeral 76, is provided and comprises an arm 77 pivotally mounted as at 78 upon the partition wall 6 and provided near its free end with a tooth 79 engageable partly in the notches 75 of the gear 74 as clearly shown in Figure 2 of the drawings. As the detent must be rendered inactive before the pins 71 coact with the gear 74 to rotate the same, a finger 80 is provided at the end of the arm 77 and projects beyond the tooth 79 and engages the periphery of the pin wheel 68 so that as the cam portions 72 ride beneath the finger, the arm 77 is swung upwardly a short distance, thereby disengaging the tooth 79 from the notches 75 and permitting rotation of the gear 74, it being understood that the cam portions are so positioned that the detent will be rendered inactive immediately prior to engagement of one or the other of the pins 71 in the notches of the gear 74 and that the detent arm will be restored to its active position through the medium of a spring 81 which is fixed preferably to the plate 63 and bears against the upper side of the said arm 77, as clearly shown in Figure 2 of the drawings. It will be understood, of course, that the pins 71 are so located with relation to the cam portions 72 of the pin wheel 68, and the parts of the detent member 76 so proportioned and the member so arranged with respect to the gear 74 and pin wheel 68, that the tooth 79 will immediately engage in the notches 75 of the said wheel 74 after the wheel has been rotated a distance of one picture area of the film, so that there is a perfect registration of the picture areas of the film with the framing aperture 21 after the film has been initially framed.

A gear 82 is rotatably mounted upon a stub shaft 83 projecting from the partition wall 6 and meshes with the pinion 73 of the pin wheel 68, and this gear, in turn, meshes with a gear 84 mounted for rotation upon a stub shaft 85 likewise in turn mounted upon the said partition wall 6. A pinion 86 is fixed upon the shaft 55 and meshes with the said gear 84, and in this manner motion is transmitted to the take-up reel 53, the gearing being so arranged and the elements thereof so proportioned that the shaft 55 will be driven at a speed, in ratio to the intermittent rotative movement of the friction wheel 40, to maintain the film sufficiently taut to insure of even winding upon the said take-up reel, the reel being, as previously stated, driven by friction through the medium of the friction disc 56, thus obviating the imposition of any undue strain upon the film as it is wound upon the reel.

The numeral 87 indicates in general a spring motor which may be of the ordinary construction and constitutes no part of the present invention and this motor is mounted within the compartment 8, preferably in the upper rear corner thereof. The power transmitting gear of the motor is indicated by the numeral 88 and, in the arrangement shown, is located above and in the same plane with the gear 84. In order that motion may be transmitted from the gear 88 of the motor 87 to the intermittent gearing of the apparatus embodying the invention, a pinion 89 is supported for rotation upon an arm 90 in such position that upon longitudinal movement of the arm through a slot in the rear wall of the casing, the pinion may be brought into and out of mesh with the gears 84 and 88. The arm is preferably provided with a slot 91 through which extends a pin 92 fixed upon the partition wall 6 and rack teeth 93 may be provided upon the lower edge of the arm to coact with a fixed pawl 94 upon the said rear wall of the casing at the lower side of the slot, a spring 95 being arranged upon the said wall of the casing to engage the upper edge of the arm to hold the arm in engagement with the pawl 94. In this manner, the arm may be held at either limit of its shifting movement, so that the gear 89 may be positioned in and out of mesh with the gears 84 and 88. This arrangement provides for operation of the apparatus either manually through the employment of the crank handle 67 or automatically through the operation of the motor 87.

As before stated, when the apparatus is to be employed as a motion picture camera, the light excluding plug or cap 34 is fitted into the rear end of the tubular section 24 of the light ray conducting tube assemblage 23 so as to exclude light rays from the film except such as are permitted to pass by way of the lens 13 and shutter 15 and the framing aperture 21 of the film gate. The film is threaded into the apparatus in a manner which will be obvious from the foregoing description, and the apparatus is operated either through the medium of the crank handle 67 or the spring motor, so as to expose the film in the usual manner.

When the apparatus is to be employed as a projector, the previously developed film is arranged within the apparatus and the plug 34 is removed and a lamp house, indicated in general by the numeral 96, is assembled with the apparatus in a manner which will now be explained.

The lamp house comprises a cylindrical casing 97 provided with a removable ventilating cap 98 at its upper end and having a bottom 99 provided with openings 100 for the purpose of ventilation. A cylindrical bushing 101 is mounted in the bottom of the casing and accommodates an electric bulb socket 102 which is vertically slidably adjustable therethrough and which at its upper end accommodates the base of an electric light bulb 103, the socket having conductor wires 104 leading thereto for the purpose of supplying current to the bulb. A set screw 105 is threaded through the wall of the bushing 101 and is adapted to be tightened so as to secure the socket 102 in its positions of vertical adjustment so that the bulb may be brought to proper position opposite the focal axis of a condenser lens set 106 which is mounted in a cylindrical barrel 107 projecting from the forward side of the casing 97 and of a diameter to adapt it to be snugly fitted into the section 24 of the tube assemblage 23, as clearly shown in Figure 1 of the drawings. The numeral 108 indicates a reflector which is provided with a threaded stem 109 threaded through the rear side of the casing 97 and having a nut 110 fitted thereon to bind against the rear side of the casing and hold the reflector in positions of adjustment with relation to the bulb 103. It will now be evident that in order to convert the apparatus into a projector it is only necessary to remove the light excluding plug 34 which has previously been employed in the use of the apparatus as a motion picture camera, and insert the condenser lens barrel 107 of the illuminating device 96 and then connect the plug of the conductor wires 104 with an ordinary socket, whereupon the apparatus is operated either by the crank handle or by the spring motor and the picture areas of the film are successively projected onto an ordinary screen.

Preferably, the casing of the apparatus will be provided at its bottom with a socket 111 to accommodate the usual threaded stud 112 of a camera tripod 113 of the ordinary construction.

Having thus described the invention, what I claim is:

1. In convertible apparatus for the photographing and projection of motion pictures, in combination, a film gate, film feeding means, an objective lens, a shutter for intermittently intercepting the passage of light rays between the lens and film gate, the film gate having a portion housing the shutter, a light ray conducting continuous conduit having an open front end presented to and forming the movable member of the film gate and having an exteriorly exposed open rear end whereby a closed path for light rays will be defined at both sides of the film gate, and a source of illumination for projecting purposes and a closure selectively engageable in exteriorly exposed rear end of the conduit.

2. In convertible apparatus for the photographing and projection of motion pictures, in combination, a film gate, film feeding means, an objective lens, a shutter for intermittently intercepting the passage of light rays between the lens and film gate, a housing on the film gate for the shutter, a light ray conducting conduit having an open front end presented to the film gate and having an exteriorly exposed open rear end and fixedly supported at said rear end, said conduit and shutter housing defining a closed path for light rays at both sides of the film gate, a lamp house having a barrel adapted to be removably fitted into the rear end of said conduit, a condenser lens in the said barrel, and a closure likewise adapted to be fitted into the rear end of said conduit, the said barrel of the lamp house and the said closure being selectively adaptable to the conduit whereby to provide for selective use of the apparatus.

3. In convertible apparatus for the photographing and projection of motion pictures, an objective lens, a shutter, a film gate, film feeing mechanism, means for operating the shutter and film feeding mechanism in consonance, light ray conducting means comprising a tubular conduit including a fixed section having an exteriorly exposed open rear end and a section telescopically fitting the fixed section and having its front end presented to the film gate and provided with means constantly engaging the film for holding the film in position against the gate, means yieldably holding the last mentioned section projected, and a source of illumination for projecting purposes and a closure selectively engageable in the said exposed open rear end of the first mentioned section of the conduit.

4. In convertible apparatus for the photographing and projection of motion pictures, an objective lens, a shutter, a film gate, film feeding mechanism, means for operating the shutter and film feeding mechanism in consequence, light ray conducting means comprising a tubular conduit including a fixed section having an exteriorly exposed open end and a section telescopically fitting the fixed section and having one end presented to the film gate and bearing upon the film for holding the film in position against the gate, means yieldably holding the last mentioned section projected, fixed means at the side of and frictionally engaging the last mentioned section of the conduit for holding the same in retracted position against the tension of the yieldable holding means, and a source of illumination for projecting purposes and a closure selectively engageable in the said exposed open end of the first mentioned section of the conduit.

5. In convertible apparatus for the photographing and projection of motion pictures, a casing, an objective lens mounted at the front wall of the casing, a shutter within the casing immediately adjacent the lens, a film gate, film feeding mechanism, a tubular housing for the shutter between the film feeding means and the lens and alined axially with the lens, means for operating said shutter and film feeding mechanism all housed within the casing, a tubular light ray conducting conduit within the casing extending between the back wall thereof and the film gate and in axial alinement with the optical axis of the objective lens, said conduit being arranged to hold the film to the film gate, a lamp house, a barrel extending therefrom, and a condenser lens within the barrel, the barrel being removably insertable into the said tubular light ray conducting conduit.

6. In convertible apparatus for the photographing and projection of motion pictures, an objective lens, a shutter, a film gate having a film channel therein and a framing opening, film feeding mechanism, means for operating the shutter and film feeding mechanism in consonance, light ray conducting means comprising a tubular conduit including a fixed section having an exteriorly exposed open end and a section telescopically fitting in the fixed section and having one end presented to the film gate, the said end of the said section having rounded bosses engaging in the channel in the film gate to coact with the film and maintain the same flat at the framing opening and also having rearwardly projecting offset side members, a spring upon the second mentioned section of the tubular conduit bearing between the same and the inner end of the first mentioned section to yieldably hold the second mentioned section in film engaging position, said spring being held to the second-mentioned section by said rearwardly projecting side members, and a source of illumination for projecting purposes and a closure selectively adaptable to the said exposed open end of the first mentioned section of the conduit.

7. In apparatus of the class described, an objective lens, a shutter, a film gate having a film channel therein and provided with a framing opening, and a light ray conduit having a member movable into and out of position for cooperation with the said gate and provided with film engaging bosses engageable in the channel of the gate.

8. In apparatus of the class described, an objective lens, a shutter, a film gate having a film channel therein and provided with a framing opening, a light ray conduit having a member movable into and out of position for cooperation with the said gate and provided with film engaging bosses engageable in the channel of the gate, and means yieldably holding the said member in active position.

9. In apparatus of the class described, an objective lens, a shutter, a film gate having a film channel therein and provided with a framing opening, a light ray conduit having a member movable into and out of position for cooperation with the said gate and provided with film engaging bosses engageable in the channel of the gate, means yieldably holding the said member in active position, and friction means for holding the said member in retracted position.

10. In apparatus of the class described, a casing, an objective lens in one wall of the casing, a film gate within the casing having a tubular portion extending to said wall of the casing in axial alinement with the lens, a shutter housed in the tubular portion of the film gate, and a light conduit extending from the film gate to the opposite wall of the casing whereby a continuous enclosed path is provided for the passage of light to the film gate in either direction.

11. In apparatus of the class described, a casing, an objective lens in one wall of the casing, a shutter, a film gate, a light ray conduit including a section fixed in the opposite wall of the casing and a movable section telescopically fitted in the fixed section and having an end presented to the film gate, means for yieldably holding said movable section against the film gate, and a fixed element on the casing converging rearwardly toward said movable section to frictionally engage the side of said movable section and hold the same retracted from the film gate.

In testimony whereof I affix my signature.

McCLELLAN C. FULLENLOVE. [L. S.]